United States Patent
Rajgopal et al.

(10) Patent No.: US 8,295,286 B2
(45) Date of Patent: Oct. 23, 2012

(54) APPARATUS AND METHOD USING HASHING FOR EFFICIENTLY IMPLEMENTING AN IP LOOKUP SOLUTION IN HARDWARE

(75) Inventors: Suresh Rajgopal, San Diego, CA (US); Lun-bin Huang, San Diego, CA (US); Nicholas Julian Richardson, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 1257 days.

(21) Appl. No.: 10/750,012

(22) Filed: Dec. 31, 2003

(65) Prior Publication Data

US 2005/0141519 A1 Jun. 30, 2005

(51) Int. Cl.
*H04L 12/56* (2006.01)
(52) U.S. Cl. .............. 370/395.32; 370/401; 707/747; 707/796; 711/216
(58) Field of Classification Search ............. 370/395.32; 711/216; 707/1, 2, 3, 4, 5, 6, 7, 8, 9, 10
See application file for complete search history.

(56) References Cited

U.S. PATENT DOCUMENTS

| | | | | |
|---|---|---|---|---|
| 5,784,699 | A * | 7/1998 | McMahon et al. | 711/171 |
| 6,067,547 | A * | 5/2000 | Douceur | 1/1 |
| 6,434,662 | B1 * | 8/2002 | Greene et al. | 711/108 |
| 6,625,612 | B1 * | 9/2003 | Tal et al. | 707/102 |
| 6,665,297 | B1 * | 12/2003 | Hariguchi et al. | 370/392 |
| 7,194,740 | B1 * | 3/2007 | Frank et al. | 718/102 |

* cited by examiner

*Primary Examiner* — Bo Hui A Zhu
(74) *Attorney, Agent, or Firm* — Munck Wilson Mandala, LLP

(57) ABSTRACT

Internet Protocol address prefixes are hashed into hash tables allocated memory blocks on demand after collisions occur for both a first hash and a single rehash. The number of memory blocks allocated to each hash table is limited, with additional prefixes handled by an overflow content addressable memory. Each hash table contains only prefixes of a particular length, with different hash tables containing prefixes of different lengths. Only a subset of possible prefix lengths are accommodated by the hash tables, with a remainder of prefixes handled by the content addressable memory or a similar alternate address lookup facility.

22 Claims, 4 Drawing Sheets

| H1 | H2 | C1 | C2 | L1 | L2 | CMP1 | CMP2 | MATCH | LPM | NXTHOP |
|----|----|----|----|----|----|------|------|-------|-----|--------|

…

APPARATUS AND METHOD USING HASHING FOR EFFICIENTLY IMPLEMENTING AN IP LOOKUP SOLUTION IN HARDWARE

TECHNICAL FIELD OF THE INVENTION

The present invention is directed, in general, to Internet Protocol address prefix lookup and, more specifically, to using hashing to perform Internet Protocol address prefix lookups.

BACKGROUND OF THE INVENTION

Network routers for packet-based communications protocols such as Internet Protocol (IP) direct incoming information to the next neighbor along a route to the intended destination for the packet. To do this, typically each router along the route must perform address prefix (normally referred to as just "prefix") lookup operations on a routing table to determine the appropriate next hop address for the destination IP prefix. Such operations are performed by either an embedded network processor or, more commonly, by a separate network search engine. In addition to performing searches on a prefix (routing) table consisting of destination prefixes and the associated next hop information, the network search engine is also typically tasked with maintaining the prefix table (i.e., inserting and deleting prefixes).

Originally the hardware for network search engines employed ternary content addressable memory (TCAM), a type of memory consisting of a bit comparator and two memory elements, one for storing data and the other storing a compare mask. The TCAM compares incoming data with the value stored in the data memory under the control of the mask value, which may be programmed to override the comparison result to "always match" (i.e., "don't care"). In operation, a TCAM-based network search engine functions by storing all prefixes of a routing table in a TCAM array in a specific, prioritized order, with each prefix's associated next hop information stored in a corresponding (linked) location in another memory. During prefix lookup, a key is placed on the comparand (compare operand) bus of the TCAM array and compared against all prefixes in the memory. The array of match results from all comparisons is sent through a priority logic unit to determine the highest priority match, with the winning match used to address the next hop memory from which the corresponding next hop information is read and returned.

However, TCAM-based solutions are generally slow, expensive and consume substantial power during operation. More recently, software based search engines using a general purpose processor and normal memory have been under development. In such devices, the routing table prefixes and next hop information are stored in the memory in data structures built according to some algorithm. Searches are performed via a series of memory read and comparison operations using the general purpose processor.

There is, therefore, a need in the art for an improved IP address lookup scheme.

SUMMARY OF THE INVENTION

To address the above-discussed deficiencies of the prior art, it is a primary object of the present invention to provide, for use in a network router, hashing of Internet Protocol address prefixes into hash tables allocated memory blocks on demand after collisions occur for both a first hash and a single rehash. The number of memory blocks allocated to each hash table is limited, with additional prefixes handled by an overflow content addressable memory. Each hash table contains only prefixes of a particular length, with different hash tables containing prefixes of different lengths. Only a subset of possible prefix lengths are accommodated by the hash tables, with a remainder of prefixes handled by the content addressable memory or a similar alternate address lookup facility.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 6, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
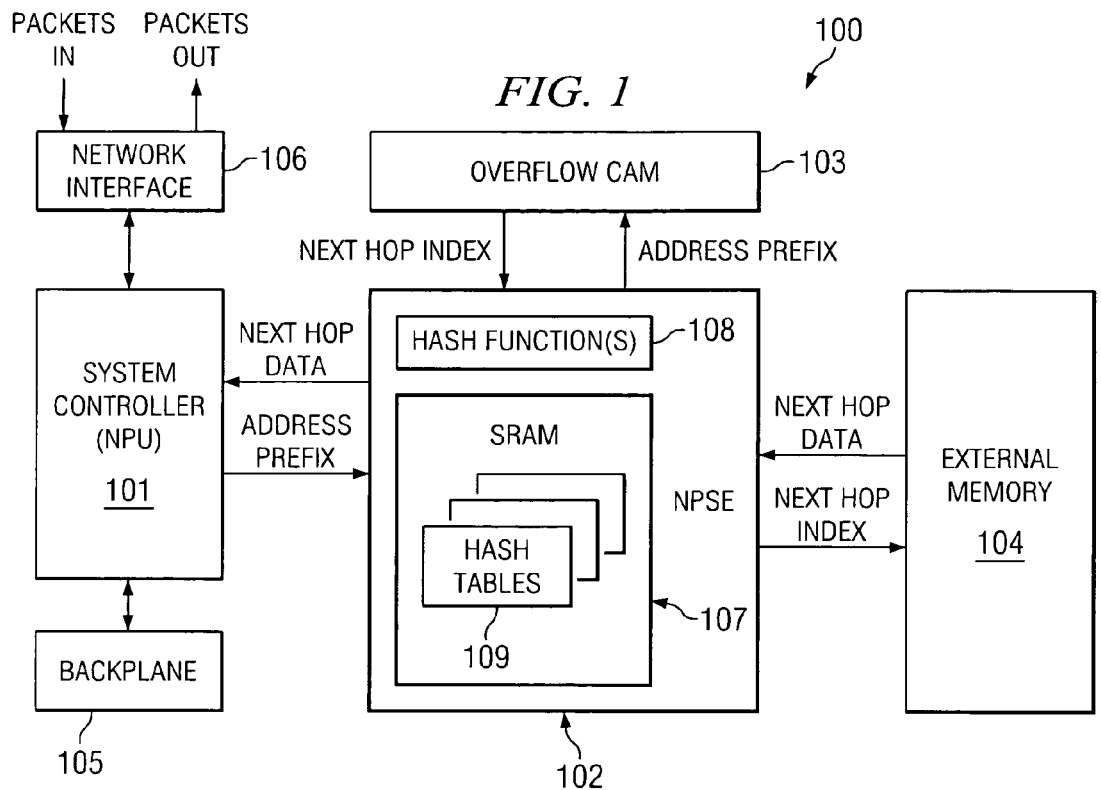
FIG. 1 depicts a processing system utilizing a hash-based network search engine according to one embodiment of the present invention.

FIG. 1 depicts a processing system utilizing a hash-based network search engine according to one embodiment of the present invention. Processing system 100 implements a portion of an Internet Protocol (IP) network router and includes a system processor/controller or network processing unit (NPU) 101 coupled to a network packet search engine (NPSE) 102, which in turn is coupled to external memories 103 and 104. Memory 103 is an overflow content addressable memory (CAM), while external memory 104 holds next hop information. NPSE 102 receives addresses and/or commands from system controller 101 as well as prefixes for looking up the next hop address, and returns the next hop address to system controller 101. System controller 101 is coupled to a backplane 105 and through a network interface 106 to a network (not shown).

In the present invention, NPSE 102 performs the IP lookup using, to the extent possible, a hash table in on-chip SRAM memory 107. Hashing is a well-known technique to enable non-sequential (near random) access to a table or array, and is useful when a wide range of values need to be stored in a small memory. Exemplary applications for hashing include databases, compilers and assemblers. In compilers, for instance, hashing is used to recognize a small (a few 100) set of tokens or keywords made up of alphanumeric characters (26+10) from the larger space ($36^6$) of all possible six-character words. In operation, a hashing function H is applied to an input data value called a "key" to produce an index into a hash table, which stores the token or keyword and is used to lookup the token or keyword.

The hashing function H must be such that it distributes the keys uniformly and/or randomly through the hash table. Since a large number of keys are mapped to a small set of tokens, there are bound to be instances where two keys, when hashed, yield the same table index, which situations are referred to as "collisions." While a good hashing function minimizes collisions, collisions that do occur may be handled in two ways: in a closed hash table approach, hashing collisions are resolved either by rehashing with another function or by stepping through the table linearly to find an available entry; in an open hash table approach, a list of items is maintained for each table entry and is traversed when a collision occurs to find the desired identifier. A closed hash table cannot accommodate more entries than the size of the table, which is not the case for an open hash table.

Hashing meets several criteria required for IP lookup, and in some ways operates similar to a content addressable memory, but without the expensive memory cell requirement since hash tables can reside in normal static random access memory 107. Hashing provides direct access to the memory, with fast lookup as in a CAM, depending on the time required to compute the hash function and index into the array. Updates (inserts or deletes) are fast, as in a CAM. With a good hash function, the storage requirement grows only linearly with the number of prefixes that need to be stored in the hash table, as in a CAM.

However, two issues must be addressed before hashing presents a viable solution for IP lookup: First, collisions during hashing must be handled efficiently. Second, while hashing is a natural solution for exact matching with a comparand, an IP lookup requires a longest prefix match.

In one proposal for using hashing to solve the longest prefix match problem, the routing table is built of hash tables organized by prefix lengths. A search starts in the hash table with the longest prefix length with a binary search performed within the hash table on all prefixes of the same length. If no match is found, the search continues with the next longest length hash table, and so on in an iterative algorithm until the longest matched prefix is found. While this iterative solution works well in software, no indication of a hardware implementation with pipelining was provided. Moreover, the solution employs dynamic random access memory (DRAM), which place a different set of constraints on the amount of memory available.

Another proposed hash-based IP lookup scheme employs multiple hardware hashing functions implements in programmable logic devices (PLDs) with parallel hash tables. The particular architecture proposed addressed classification of multicast packets and packet flows, and was thus concerned with only exact matches, not longest matches.

In the present invention, an on-chip SRAM 107 holds hash tables 109 created by and accessed using at least one hash function 108, with an overflow CAM 103 to handle collisions. To minimize collisions, utilization of SRAM 107 is maximized by an on-demand block-based allocation scheme to make efficient use of available memory resources and rehashing. Parallel lookups in hardware across multiple hash tables organized by prefix lengths help address the fundamental problem of converting the exact match result from a single hash into a longest prefix match. Virtual banks address variation in hash table sizes across different prefix lengths. By dividing the memory into small blocks that are dynamically allocated to any bank as required through the use of a crossbar, the hash table size can be tailored to each dataset and the capacity of the search engine maximized under all conditions.

The hardware solution of the present invention is designed to accommodate large routing tables, in excess of 256,000 Internet Protocol version 4 (IPv4) prefixes, to support packet lookups at the Optical Carrier level 192 (OC-192) data rate and beyond, and to handle modest update rates, all at a fraction of the power and cost of current TCAM systems.

Figure 2:
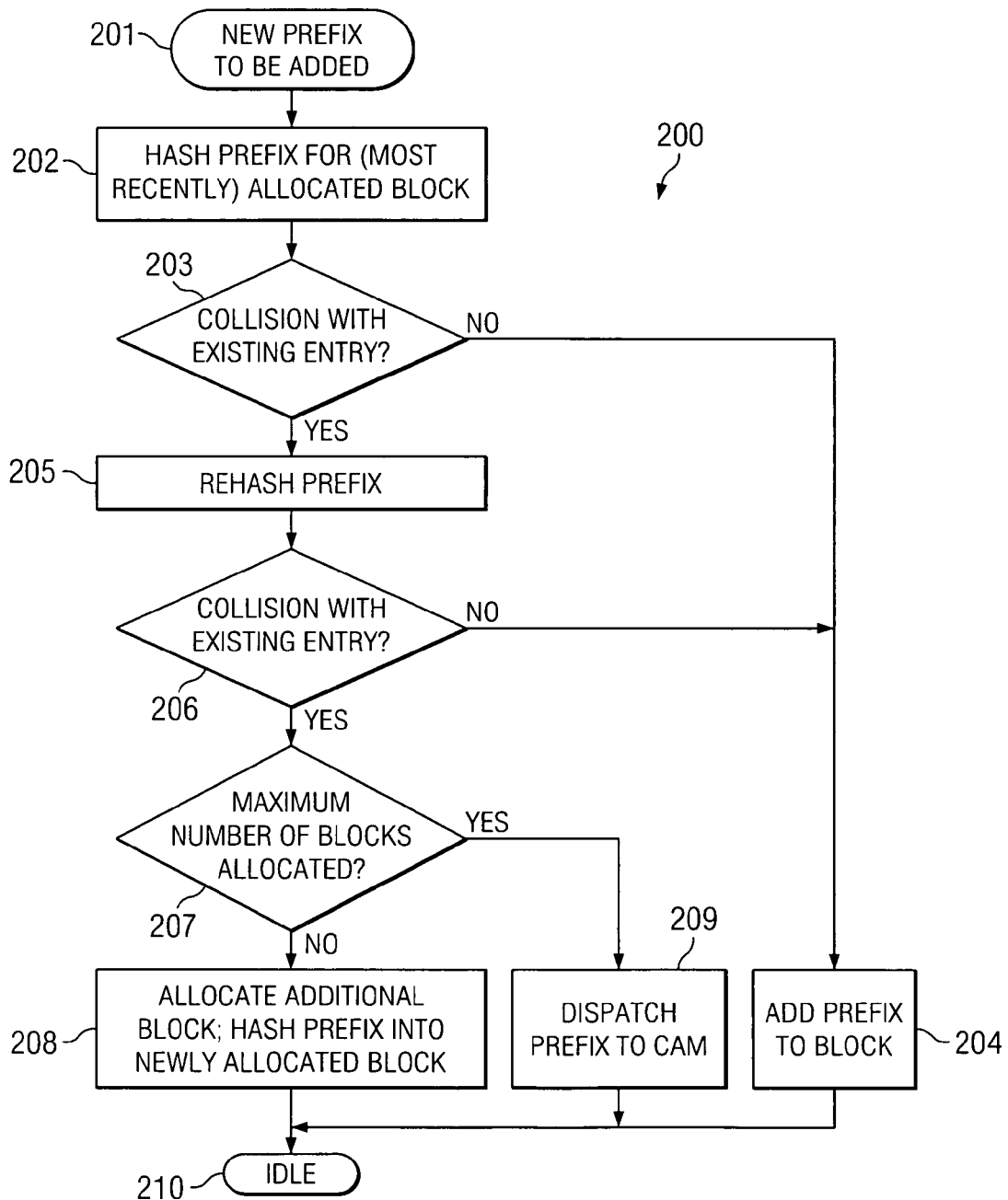
FIG. 2 is a high level flowchart for a process of using a hash table in a hash-based IP lookup scheme according to one embodiment of the present invention.

FIG. 2 is a high level flowchart for a process of using a hash table in a hash-based IP lookup scheme according to one embodiment of the present invention. The block-based lookup scheme uses SRAM 107 together with a small amount of CAM 103 to perform IP next hop address lookups. Ensuring that the SRAM 107 is maximally utilized can minimize collisions. For that reason, a first optimization in the present invention is use of additional hashing functions to rehash the result from a first hash of the comparand. Due to SRAM speed limitations, rehashing is limited to only one rehash—that is, the comparand is hashed twice (at most), using two different hash functions 108. Preferably, allocation of a hash table entry for a given prefix is based on the result of a first hash unless a collision with an entry previously allocated for a different prefix occurs. In that event, the result of the first hash is rehashed using a second, different hashing function.

Figure 3:
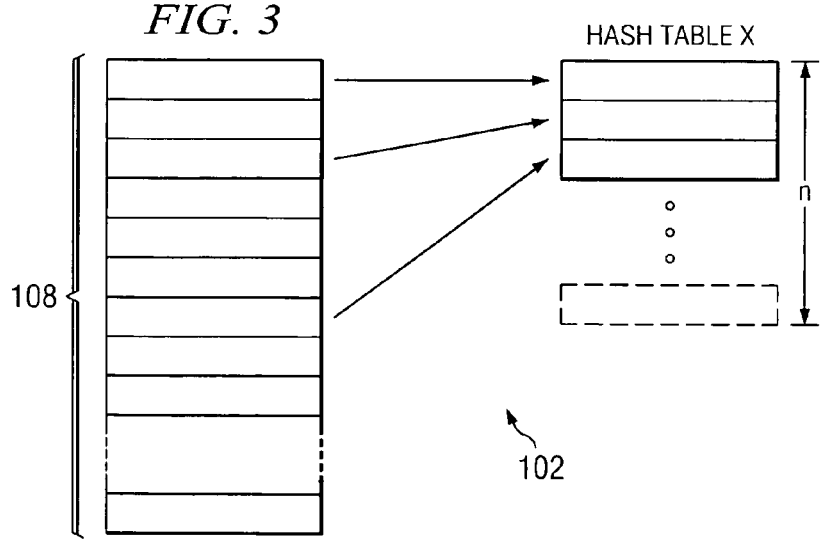
FIG. 3 is a diagram illustrating in further detail the block-based allocation of memory to a hash table in a hash-based IP lookup scheme according to one embodiment of the present invention.

FIG. 3 is a diagram illustrating in further detail the block-based allocation of memory to a hash table in a hash-based IP lookup scheme according to one embodiment of the present invention. A second optimization to minimize collisions in the present invention is use of block-based SRAM allocation for each hash table. A small, fixed block of SRAM is first allocated for a given hash table. When rehashing no longer yields an empty slot (i.e., the existing block is full), another block is allocated and the IP address is hashed into the second block. This on-demand block allocation makes efficient use of available SRAM while minimizing collisions. With infinite SRAM, blocks could be continually allocated and collision completely avoided. However, at some point the SRAM will begin to exhibit poor utilization and allocation of additional blocks is no longer efficient. At that point, rather than allocating more blocks to handle collisions, the additional prefix entries are dispatched to an overflow CAM 103.

The goal in selecting a point at which additional prefixes are dispatched to overflow CAM 103 is to minimize the size of overflow CAM 103 while maximizing utilization on the SRAM 107. Different criteria may be set for determining when to stop allocation blocks to a given hash table, the simplest of which is to pre-assign a fixed (maximum) number of blocks n and stop when all of those blocks are allocated to the hash table, an approach reducing design risks.

The block-based allocation scheme may be viewed as a multi-level hashing approach, where the number of levels is very large (as many as the maximum number of blocks that may be allocated) and the size of the SRAM is the same at each level. This approach makes organizing memory architecture for hardware implementation easy.

Referring back to FIG. 2, the process 200 of employing a hash table having at least one allocated block of memory begins with a new prefix to be added to that hash table (step 201). The new prefix is hashed for the only existing or most recently allocated block of memory in the hash table (step 202), and a determination is made of whether the hash result collides with an existing entry in the subject block (step 203). If not, the prefix is added to the hash table (step 204). If so, however, the hash result is rehashed using a second hash function (step 205) and a determination is again made as to whether the rehash result collides with an existing entry in the subject block (step 206). If no collision is identified, the prefix is added to the hash table (step 204).

If a collision exists after rehashing, a determination is made as to whether the maximum number of blocks has already been assigned to the hash table (step 207). If not, an additional block of memory is allocated to the hash table and the prefix is hashed into that newly allocated block (step 208). If so, however, the prefix is dispatched to the overflow CAM (step 209). The process then becomes idle until another prefix needs to be added to the hash table (step 210).

Figure 4:
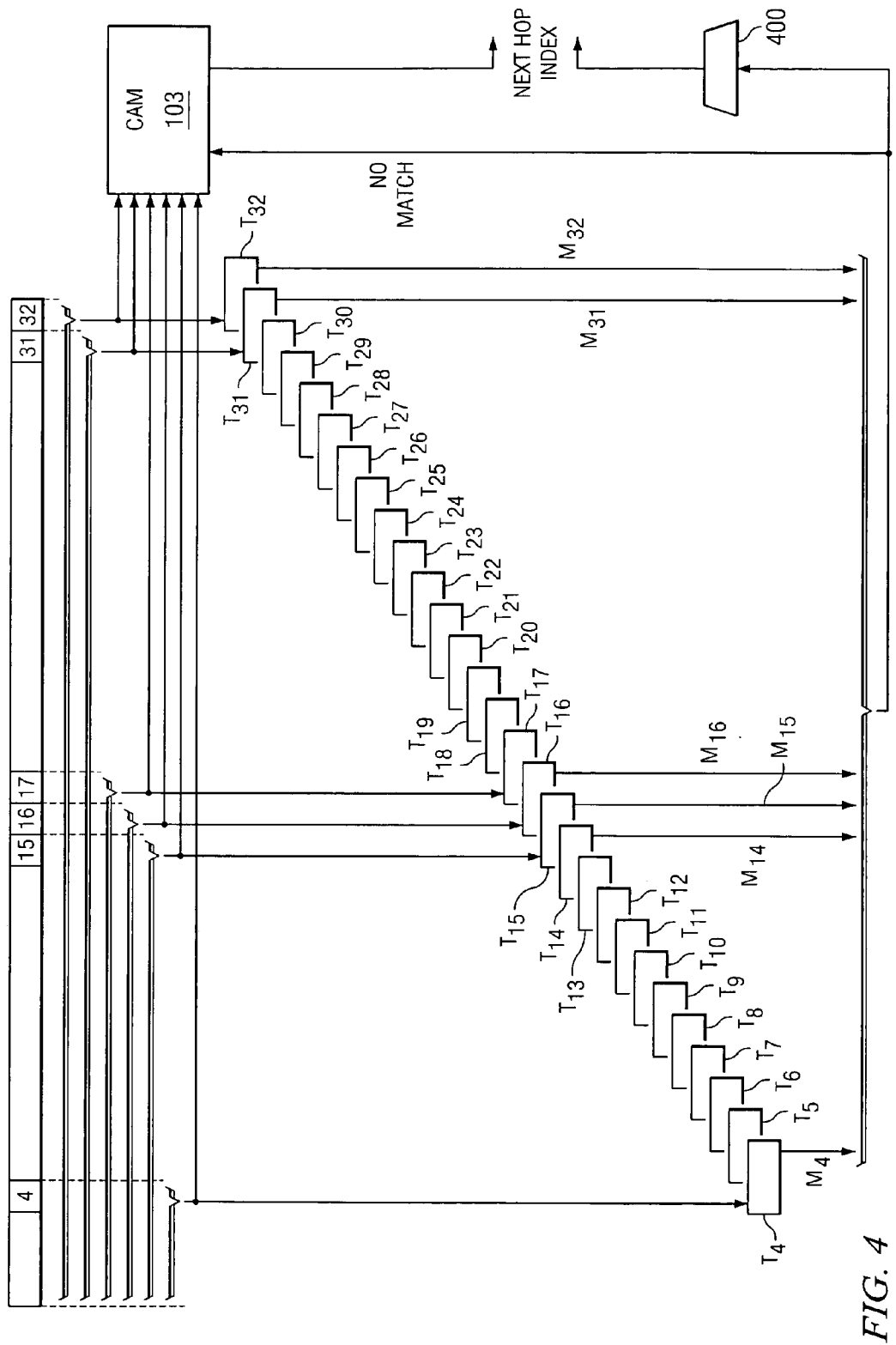
FIG. 4 depicts a mechanism for determining a longest-prefix match within a block-based memory allocation, hash-based IP lookup scheme according to one embodiment of the present invention.

FIG. 4 depicts a mechanism for performing a longest-prefix match in a hash-based IP lookup scheme according to one embodiment of the present invention. The fundamental problem of performing a longest prefix match with hash tables is addressed in the present invention by creating a hash table $T_4$-$T_{32}$ for each different prefix length. Accordingly, all prefixes of length 24 bits are hashed into hash table $T_{24}$, and so on for other prefix lengths. The memory allocation scheme described above is employed for the hash table associated with each prefix length.

In operation, when the longest prefix match for a 32 bit IP address is needed, in addition to hashing the full address for comparison to entries within the hash table $T_{32}$ for 32 bit prefixes, all smaller prefix lengths of the address (31, 30, 29, 28, etc.) are simultaneously hashed in parallel for comparison with entries within their respective hash tables ($T_{31}$, $T_{30}$, $T_{29}$, $T_{28}$, etc.). Match signals ($M_{32}$, $M_{31}$, $M_{30}$, $M_{29}$, $M_{28}$, etc.) from each hash table $T_4$-$T_{32}$ are passed to a priority encoder 400 to resolve multiple matches and determine the longest prefix match. In this manner, exact matching determined by hashing can be combined on different prefix lengths. The different length prefixes and a signal derived from the match signals and indicating no match in any of the hash tables $T_4$-$T_{32}$ are passed to CAM 103 for overflow processing, in the event that a hash table has used the maximum number of blocks allowed.

To minimize storage complexity of all the hash tables, additional optimizations are needed. Typically very few (<1%) of IPv4 prefixes are in the 1-16 bit range, as seen from Autonomous System Map (ASMap) routing table distributions and verified independently in analyses of different routing table distributions. Therefore hashing is preferably selectively employed only for prefixes in the 16-32 bit length range. The remaining prefix lengths (1-15) may be handled either using the overflow CAM 103 or by using a multi-bit (compressed or uncompressed) trie. The choice of prefix lengths for which hash tables are employed may optionally be made programmable.

Each entry in a hash table needs to contain just the prefix (a maximum of 32 bits) and a valid bit (33 bits in all). The next hop data for each prefix is stored off-chip from the search engine 102, in extended memory 104, accessed by a next hop index generated on-chip from the hash table block address and its offset. The index goes off-chip as a next hop address or as an address to a mapping table that then generates the next hop address. This removes the requirement of storing the next hop data (and per-route information) on-chip. Since modern routers would require additional memory to collect statistics on a given route, implementing per-route information off-chip is best, and provides flexibility to the system designer. While off-chip per-route information storage does place some requirements on the external memory 104, such commodity memories are cheaper.

Figures 5, 6:
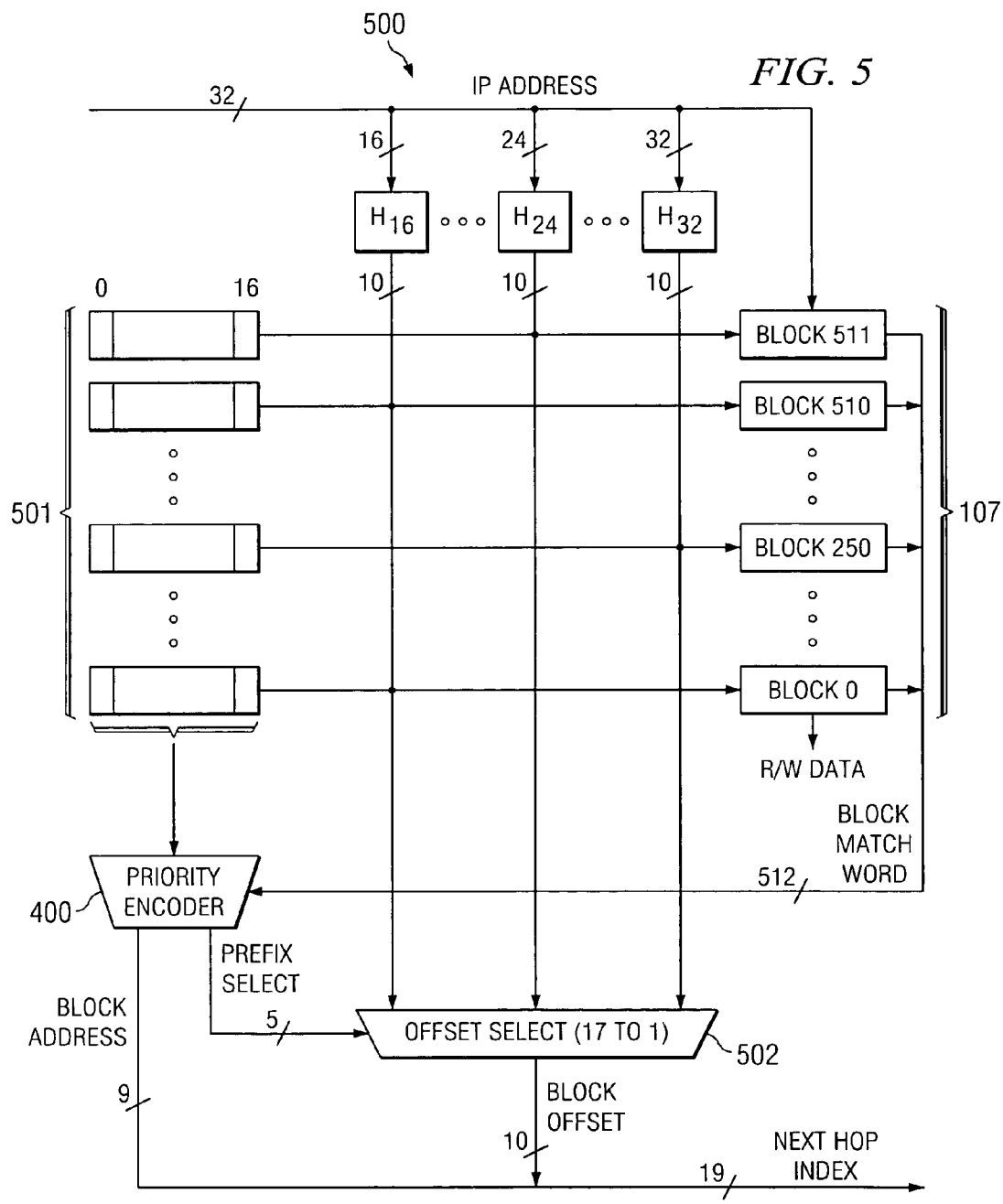
FIG. 5 depicts an exemplary implementation for a block-based memory allocation, longest-prefix match, hashing IP lookup scheme according to one embodiment of the present invention.
FIG. 6 illustrates a lookup pipeline for a hashing IP lookup scheme according to one embodiment of the present invention.

FIG. 5 depicts an exemplary implementation for a block-based memory allocation, longest-prefix match, hashing IP lookup scheme according to one embodiment of the present invention. Block-based hashing IP lookup search mechanism 500 includes a 512K entry routing table implemented with selective hashing for prefixes of length 17-32 and block-based memory allocation using a basic memory block size 1K×32. Memory 501 is organized as a crossbar structure with seventeen banks, one for each prefix length. All seventeen hash functions $H_{16}$-$H_{32}$ are computed in parallel to generate a 10 bit block offset address.

Each memory block 0-511 has an associated 17 bit block configuration register (BCR) 501 containing the configuration of the prefix length/hash function to which the corresponding memory block is allocated, if any, and responsible for selecting the 10 bit block offset address from the appropriate hash function for routing to the assigned memory block.

Each memory block is a 1K×32 SRAM memory with a comparator at the output matching the appropriate subset of bits from the incoming prefix with the block entry read from the SRAM at the block offset address generated by the hash function and generating a hit or miss. During a lookup, all blocks for all prefix lengths are accessed in parallel. The memory blocks also support sequential read/write operations during which the address does not come from the hash function outputs.

FIG. 6 illustrates a lookup pipeline for a hashing IP lookup scheme according to one embodiment of the present invention. The seven-stage pipeline 600 is executed in parallel for all seventeen prefix lengths. The hash stage H1, H2 hashes the IP address and generates a block offset address. The configure stage C1, C2 configures and routes the block offset address to the appropriate memory block using the block configuration register.

The lookup stage L1, L2 accesses the memory block(s) for all memory blocks allocated to a given prefix lengths, while the compare stage CMP1, CMP2 compares memory entries with the prefix subset of the subject IP address and generate a match. The match stage MATCH selects the matched line (if a match is identified) and generates matched prefixes. The longest prefix match stage LPM executes a priority select to determine the longest prefix among the matched prefixes, and the next hop stage NEXTHOP generates a next hop index from the block index and block offset address.

In the implementation 600 depicted, rehashing with the second hash function H2 is pipelined and performed before the result of the first hash function H1 is known. To guarantee maximum throughput, the computation of the hash functions H1 and H2 and the lookup (i.e., the first four stages, H1/H2, C1/C2, L1/L2 and CMP1/CMP2) all need to execute at twice the base frequency of the lookup engine to guarantee that a lookup is performed every clock cycle. Accordingly, the SRAM memory blocks accessed in the third stage LOOKUP need to be twice as fast, performing two reads in one clock cycle. A 200 megaHertz (MHz) base frequency would require at least a 2.5 nanosecond (ns) access time for the SRAM memory blocks (i.e., 400 MHz) in order to provide throughput of 200M lookups/second. Queueing and fetching the next hop data may take anywhere from 5-6 cycles, resulting in a round-trip latency of 12-13 cycles.

Updating an existing prefix requires doing a lookup to access the next hop index, which can then be used to update the next hop information. Insertion and deletion of prefixes first requires a lookup to verify that the prefix does not exist (for inserts) or does exist (for deletes). Once the absence or existence of the prefix is verified, the prefix may be inserted.

During a prefix insertion, the valid bit of the addressed entry in every allocated SRAM memory block associated with the appropriate prefix length is sequentially examined. If the bit is asserted, the addressed location for that memory block is occupied, and the addressed location for the next memory block is examined. The process continues until a block with an empty entry at the addressed location (valid bit is not asserted), or until the maximum number of memory blocks have been both allocated to the prefix length and examined. This ensures that an incoming prefix will be placed in only one memory block so that a lookup operation will result in a unique match from only one of the memory blocks associated with the prefix.

Updates are not expected to be as frequent as lookups, such that only periodic stealing of lookup cycles to complete the task is expected. Some worst case update conditions to consider include: If all memory blocks allocated to a prefix length already contain valid entries, then the insert will need to be performed in the CAM, requiring traversal of all blocks associated with the prefix followed by a CAM insert. If the CAM is also full, block reallocation will be required, which can be computationally expensive since moving CAM entries back into the SRAM memory blocks or freeing up poorly utilized SRAM blocks for other prefixes-both involving rehashing— is required. This circumstance should preferably be detected before the CAM fills up so that memory management and block reallocation may begin in the background.

The present invention allows hashing to be employed for IP address prefix lookup. Block based memory allocation on demand, with a limit to the maximum number of blocks allocated to a given hash table, simplifies memory architecture organization. Rehashing (once only) and overflow CAM are employed to handle collisions. Longest prefix matches are identified by parallel lookups for each prefix length and priority encoding of the resulting matches.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. An address lookup structure comprising:
   a plurality of hash tables each storing prefixes for address lookups;
   a content addressable memory storing at least some prefixes for which a collision occurs within at least one of the hash tables; and
   a hashing lookup search mechanism that comprises:
   a routing table implemented with selective hashing for a plurality of prefixes with different lengths; and
   a plurality of memory blocks, wherein each hash table is allocated a group of the memory blocks based on a size of the respective hash table and a pre-assigned maximum number of allocated blocks.

2. The address lookup structure according to claim 1, wherein each hash table is allocated a smallest number of memory blocks sufficient to hold prefixes for which no collision occurs within the respective hash table.

3. The address lookup structure according to claim 1, wherein each hash table is allocated no more than the pre-assigned maximum number of memory blocks.

4. The address lookup structure according to claim 1, wherein each hash table contains prefixes hashed by one of two hash functions, a second of the two hash functions employed when a collision occurs with a first of the two hash functions.

5. The address lookup structure according to claim 1, wherein each hash table contains different length prefixes.

6. The address lookup structure according to claim 1, wherein the hashing lookup search mechanism further comprises:
   a configuration register associated with each memory block, each configuration register identifying a prefix length to which the respective memory block is allocated.

7. The address lookup structure according to claim 1, wherein a configuration register identifies the hash function to which the respective memory block is allocated.

8. The address lookup structure according to claim 5, further comprising:
   a priority encoder selecting a longest prefix when a plurality of matches occur between different length portions of a prefix and prefixes in each of two or more of the hash tables.

9. The address lookup structure according to claim 5, wherein the plurality of hash tables contain only a subset of different length prefixes possible under an addressing scheme, and wherein a remainder of the different length prefixes are stored in the content addressable memory.

10. A network router comprising:
    an address lookup structure that includes:
    a plurality of hash tables each storing prefixes for address lookups;

a content addressable memory storing at least some prefixes for which a collision occurs within at least one of the hash tables; and a hashing lookup search mechanism that comprises:

a routing table implemented with selective hashing for a plurality of prefixes with different lengths; and a plurality of memory blocks, wherein each hash table is allocated a group of the memory blocks based on a size of the respective hash table and a pre-assigned maximum number of allocated blocks;

a network search engine containing the hash tables and coupled to the content addressable memory, the network search engine performing address lookups using the hash tables; and an external memory coupled to the network search engine and containing per route information indexed by a next hop index generated by the network search engine.

11. A network including a plurality of interconnected network routers, wherein at least one of the plurality of interconnected network routers comprises:

an address lookup structure that includes:

a plurality of hash tables each storing prefixes for address lookups;

a content addressable memory storing at least some prefixes for which a collision occurs within at least one of the hash tables; and a hashing lookup search mechanism that comprises:

a routing table implemented with selective hashing for a plurality of prefixes with different lengths; and a plurality of memory blocks, wherein each hash table is allocated a group of the memory blocks based on a size of the respective hash table and a pre-assigned maximum number of allocated blocks;

a network search engine containing the hash tables and coupled to the content addressable memory, the network search engine performing address lookups using the hash tables; and an external memory coupled to the network search engine and containing per route information indexed by a next hop index generated by the network search engine.

12. An address lookup structure comprising:

a plurality of hash tables each containing prefixes of a different length than prefixes within other hash tables within the plurality, the hash tables collectively containing only a subset of different prefix lengths less than or equal to an address length;

an additional address lookup facility handling a remainder of the different address lengths not accommodated by the plurality of hash tables; and a hashing lookup search mechanism that comprises:

a routing table implemented with selective hashing for a plurality of prefixes with different lengths; and a plurality of memory blocks, wherein each hash table is allocated a group of the memory blocks based on a size of the respective hash table and a pre-assigned maximum number of allocated blocks.

13. The address lookup structure according to claim 12, wherein the additional address lookup facility comprises a content addressable memory.

14. The address lookup structure according to claim 12, wherein each of the plurality of hash tables is contained in one or more memory blocks allocated based on hashing of each prefix contained in the respective hash table using at least a first hash function, wherein a number of memory blocks allocated to the respective hash table does not exceed the pre-assigned maximum number, and wherein a remainder of prefixes of a length corresponding to prefixes within the respective hash table are handled by the additional address lookup facility.

15. The address lookup structure according to claim 12, further comprising:

a priority encoder selecting a longest prefix match from matches identified within the plurality of hash tables.

16. A method of operating an address lookup comprising:

storing at least some address prefixes in each of a plurality of hash tables, wherein each hash table is allocated a different group of memory blocks from a plurality of memory blocks, wherein a number of the memory blocks allocated to a hash table is based on a size of the respective hash table and a pre-assigned maximum number of allocated blocks;

storing address prefixes for which a collision occurs within at least one of the hash tables in a content addressable memory; and operating a hashing lookup search mechanism that comprises a routing table implemented with selective hashing for a plurality of prefixes with different lengths.

17. The method according to claim 16, further comprising:

maintaining each hash table within a smallest number of memory blocks sufficient to hold all required prefixes for which no collision occurs within the respective hash table.

18. The method according to claim 16, further comprising:

allocating each hash table no more than the pre-assigned maximum number of memory blocks.

19. The method according to claim 16, further comprising:

hashing prefixes in each hash table with one of two hash functions, a second of the two hash functions employed when a collision occurs with a first of two hash functions.

20. The method according to claim 16, further comprising:

storing, in each of a plurality of hash tables, prefixes of a different length than prefixes contained in any other of the plurality of hash tables.

21. The method according to claim 20, further comprising:

selecting a longest prefix when a plurality of matches occur between different length portions of a prefix and prefixes in each of two or more of the plurality of hash tables.

22. The method according to claim 20, further comprising:

storing prefixes corresponding to only a subset of different prefix lengths possible under an addressing scheme in the plurality of hash tables; and storing a remainder of prefixes in the content addressable memory.

* * * * *